2,748,139

AROMATIC CARBOXYLIC ACID SALTS OF TETRA ALKYL ETHYLENE DIAMINES

John V. Scudi, Springfield, N. J., and Floyd E. Anderson, Yonkers, N. Y., assignors to Nepera Chemical Co., Inc., Yonkers, N. Y., a corporation of New York No Drawing. Application October 29, 1953, Serial No. 389,154

17 Claims. (Cl. 260—295.5)

This invention relates to aromatic acid salts of certain tetra-alkylethylenediamines. It particularly refers to such salts in which the tetra-alkylethylenediamines themselves have some bacteriostatic properties and are unsuitable for such use for various reasons, but by the combination of them with the aromatic acids these undesirable qualities were diminished and the bacteriostatic properties of the salts exceed those of the separate reactants.

The tetra-alklethylenediamines contemplated are represented by the following general formula:

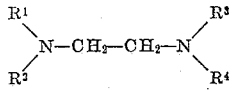

in which $R^1$ is an alkyl group containing 6 to 14 carbon atoms; $R^2$, $R^3$ and $R^4$ are lower alkyl radicals, containing 1 to 3 carbon atoms; $R^2$, $R^3$ and $R^4$ may be, but are not necessarily, alike; $R^3$ and $R^4$ are generally alike.

The compounds represented by above general formula are viscous, oily liquids. They are insoluble in water. Due to their alkalinity, they are irritating when applied to mucous membranes or even to the unbroken skin. While these compounds possess anaesthetic and antibacterial properties of various degrees of potency, they cannot be incorporated in ointment bases, due to the above-mentioned undesirable properties.

We have now found that simple aromatic acid salts of the above-defined bases do not have the undesirable qualities mentioned. The combining of the said bases and aromatic acids has a synergistic effect and the resulting salts are water soluble, retain their anaesthetic properties, are non-irritating, and surprisingly their antibacterial properties are greatly increased.

The aromatic carboxylic acids we propose to use in preparing our new compounds are, for instance, benzoic acid and substituted benzoic acids, such as the three isomeric aminobenzoic acids. Also hydroxy substituted benzoic acids like salicylic, gentisic and resorcylic acids. Heterocyclic carboxylic acids such as the pyridine carboxylic acids are also satisfactory, including nicotinic acid, isocinchomeronic acid and quinolinic acid. We may also use short side chain aromatic acids, where the side chain may be saturated or unsaturated and may, or may not, have a hydroxyl attached to it. The side chain may contain from 2 to 6 carbon atoms. Such acids, for example, may be phenyl acetic acid, mandelic acid (phenylhydroxy acetic acid), hydrocinnamic (phenyl propionic) acid, cinnamic (phenyl acrylic) acid, gamma-phenylbutyric acid, oxyhydrocinnamic (beta-oxy, beta-phenyl propionic) acid and others. These acids, for example, are those formed structurally by the addition of a benzyl, hydroxy benzyl, beta-phenyl ethyl, gamma-phenyl propyl, styryl or beta-hydroxy beta-phenyl ethyl radical to a carboxyl group.

The tetra-alkylethylenediamines, hereinafter called "bases" for brevity, and the acids themselves have certain amounts of antibacterial properties, as will be pointed out hereinafter. The minimal bacteriostatic concentrations were determined by the serial twofold dilution method described by Duca et al. (Proc. Soc. Exp. Bio. Med. 66, pp. 123–126, 1947), except that nutrient broth was used as the medium and the highest concentration tested was 64 mg. percent (w./v.). This is a dilution of approximately 1:1,500. (A dilution of 1 mg. percent is 1:100,000.)

The antibacterial activity of the new compounds were tested against several micro-organisms, but only the most important ones are recorded in these specifications.

These are the following:
Staphylococcus aureus abbreviated as (St. aur.)
Shigella sonnei abbreviated as (Sh. sonn.)
Bacillus subtilis abbreviated as (Bac. subt.)
Vibrio metchinkovi abbreviated as (Vi. metch.)
Mycobacterium tuberculosis var. hominis abbreviated as (M. tub. hom.)
Mycobacterium tuberculosis var. bovinis abbreviated as (M. tub. bov.)

The results will be shown after the examples respectively.

All the salts embodying this invention contain about 45 to 65% base as one of the components thereof. Comparision of the minimal bacteriostatic concentration of the bases and of the acids with that of the new salts shows that for bacteriostasis the minimal concentration for the salt is less in every case than the sum of minimal concentrations of its components when used alone and that in most cases the minimal concentration of the salt contains less of each of its components than the minimal necessary concentration of the respective components when they are used alone. Therefore, it is clear that the salts exert an antibacterial action greater than the sum of the activities of their respective constituents alone.

The salts of the bases are prepared by dissolving stoichiometric quantities of the base and the acid separately in a non-aqueous dry solvent, such as absolute alcohols or acetone, mixing the two solutions together, cooling and collecting the formed precipitate. To facilitate the crystal formation, part of the solvent may be distilled off on a steam bath. They may be also formed by dissolving the acid in the base by slight warming. Aqueous solutions of the salt may be prepared by dissolving the crystalline salt in water, or by dissolving the stoichiometric quantities of the base and acid together in warm distilled water. Concentrated solutions may be made by using dilute alcohol (5–25%) instead of water.

Since the tetra-alkylethylenediamines, the bases, are dibasic, they form salts with one or two mols of the acids. All these salts form colorless crystals; they are soluble in water, alcohol and acetone; slightly soluble in chloroform and benzene, from which they may be recrystallized; insoluble in ether and ligroine.

The following are several illustrative examples of some of the preferred procedures of carrying out the present invention which are given for illustration and not for limitation.

EXAMPLE 1

To 8.31 grams of N-(n-dodecyl)-N,N',N'-trimethylethylenediamine ($C_{17}H_{38}N_2$) dissolved in 200 ml. of dry ether was added drop by drop, with continuous stirring, a solution of 4.74 grams of beta-resorcylic acid ($C_7H_6O_4$) in 200 ml. of dry ether. An immediate turbidity develops and an oil separates out with the increasing addition of the acid. Upon standing under refrigeration, the oil becomes crystalline. The filtered crystals are washed with ether and dried in a desiccator over calcium chloride. The product, N-(n-dodecyl)-N,N',N'-trimethylethylenediamine beta-resorcylate, $C_{17}H_{38}N_2 \cdot C_7H_6O_4$ forms white crystals. The melting point of the product is 68–71° C. In a nitrogen analysis (Micro-Dumas) there was found N=6.45%, theory=6.66%. Mol. wt. 424.608; base in the salt 63.68%.

EXAMPLE 2

To 0.764 gram of N-(n-dodecyl)-N,N',N'-trimethylethylenediamine dissolved in 5 ml. of dry ether is added dropwise a solution of 0.859 gram of mandelic acid ($C_8H_7O_3$) in 10 ml. of dry ether. A white crystalline precipitate developed immediately. The crystals were collected on a filter and washed with 10 ml. of ether, dried and recrystallized from a mixture of 10 ml. of ether and 10 ml. of acetone. The product, N-(n-dodecyl)-N-N',N'-trimethylethylenediamine dimandelate, $$C_{17}H_{38}N_2 \cdot 2C_8H_7O_3$$

forms white crystals. The melting point of the product is 81–82° C. In a nitrogen analysis (Micro-Dumas) there was found N=4.84%, theory=4.87%. Mol. wt. 574.77; base in the salt 47.07%.

EXAMPLE 3

The disalicylate of N-(n-dodecyl)-N,N',N'-trimethylethylenediamine, $C_{17}H_{38}N_2 \cdot 2C_7H_6O_3$, was prepared by mixing stoichiometric quantities of the base and salicylic acid. The melting point of the product is 38–40° C. In a nitrogen analysis (Micro-Dumas) there was found N=5.10%, theory 5.12%. The molecular weight of the salt is 546.726 and its base content is 49.47%.

The antibacterial properties of these salts were determined as referred to in the foregoing and the following results were obtained:

*Minimal bacteriostatic concentrations in mg./percent*

| Organism Tested | Base of Ex. 1–3 | A | B | C | D | E | F |
|---|---|---|---|---|---|---|---|
| St. aur | 1 | 64 | 0.12 | 64 | 0.03 | 64 | 1 |
| Sh. sonn | 2 | 64 | 1 | 64 | 1.0 | 32 | 2 |
| Bac. subt | 1 | 64 | 1 | 64 | 1.0 | 32 | 2 |

A=Beta-resorcylic acid.
B=Base B-resorcylate.
C=Mandelic acid.
D=Base dimandelate.
E=Salicylic acid.
F=Base disalicylate.

EXAMPLE 4

A mixture of 2.0428 grams of N-(n-hendecyl)-N,N',N'-trimethylethylenediamine, $C_{16}H_{36}N_2$, and 2.200 grams of salicyclic acid was warmed on a steam bath until the solution became clear and homogeneous. The solution was placed in a refrigerator and after remaining there several days, it became crystalline. The product N-(n-hendecyl)-N,N',N'-trimethylethylenediamine disalicylate $C_{16}H_{36}N_2 \cdot 2C_7H_6O_3$ melts at 53–54° C. In a nitrogen analysis (Micro-Dumas) there was found N=5.28%, theory 5.26%. Mol. wt. 532.71; base in the salt 48.16%.

EXAMPLE 5

The beta-resorcylate of N-(n-hendecyl)-N,N',N'-trimethylethylenediamine was prepared in dry ether as in Example 1. The white crystalline product $$C_{16}H_{36}N_2 \cdot C_7H_6O_4$$

melts at 65.5–67° C. In a nitrogen analysis (Micro-Dumas) there was found N=6.79%; theory=6.82%. Mol. wt. 410.588; base in the salt 62.47%.

EXAMPLE 6

The dimandelate of N-(n-hendecyl)-N,N',N'-trimethylethylenediamine was prepared in dry ether as in Example 2. The white crystalline product, $C_{16}H_{36}N_2 \cdot 2C_8H_7O_3$, melts at 78–79° C. In a nitrogen analysis (Micro-Dumas) there was found N=4.78%, theory=5.00%. Mol. wt. 560.75; base in the salt 45.74%.

The antibacterial properties of these salts were determined as referred to in the foregoing and the following results were obtained:

*Minimal bacteriostatic concentrations in mg./percent*

| Organism Tested | Base of Ex. 4–6 | A | B | C | D | E | F |
|---|---|---|---|---|---|---|---|
| Vi. metch | 0.25 | 0.5 | 0.25 | 64 | 0.25 | 16 | 0.25 |

A=Beta-resorcylic acid.
B=Base beta-resorcylate.
C=Mandelic acid.
D=Base dimandelate.
E=Salicylic acid.
F=Base disalicylate.

EXAMPLE 7

A mixture of 2.3408 grams of N-isopropyl-N-n-octyl-N,N'-dimethylethylenediamine, $C_{15}H_{34}N_2$ and 2.6667 grams of salicylic acid were warmed on a steam bath until a homogeneous solution resulted. The solution was placed into a refrigerator and after a brief interval it became crystalline. The product, N-isopropyl-N-n-octyl-N',N'-dimethylethylenediamine disalicylate, $$C_{15}H_{34}N_2 \cdot 2C_7H_6O_3$$

melts at 60–61° C. In a nitrogen analysis (Micro-Dumas) there was found N=5.31%, theory=5.40%. Mol. wt. 518.68; base in the salt 46.73%.

EXAMPLE 8

The beta-resorcylate, the dimandelate and the gentisic salts of N-isopropyl-N-n-octyl-N',N'-dimethylethylenediamine base were prepared in dry ether as described in Example 1. They are low melting white crystalline products.

The antibacterial properties of these salts were determined as referred to in the foregoing and the following results were obtained:

*Minimal bacteriostatic concentrations in mg./percent*

| Organism Tested | Base of Ex. 7–8 | A | B | C | D | E | F |
|---|---|---|---|---|---|---|---|
| St. aur | 16 | 64 | 16 | 64 | 32 | 64 | 16 |
| Vi. metch | 16 | 16 | 16 | 0.5 | 4 | 64 | 32 |

A=Salicylic acid.
B=Base disalicylate.
C=Beta-resorcylic acid.
D=Base B-resorcylate.
E=Mandelic acid.
F=Base dimandelate.

The salts described in above examples form low melting crystals. They are difficult to crystallize and concentrated solutions may also be conveniently prepared by dissolving the stoichiometric quantities of the base and acid together in water. In some cases, the addition of a small quantity of alcohol facilitates the preparing of the solution and as they are further diluted for testing, the small quantity of alcohol added does not influence the results obtained.

For instance, we have made a 1% solution of the dimandelate of N-isopropyl, N-n-octyl, N',N'-dimethylethylenediamine by placing 0.8960 gram (1 equivalent) of the base and 1.1094 grams (2 equivalents) of mandelic acid into a 200 ml. volumetric flask and filling up to the mark with distilled water. The molecular weight of the dimandelate salt is 546.72; 44.33% of which is the base.

We have prepared in similar way a 1% solution of the disalicylate of N-isopropyl, N-n-octyl, N',N'-dimethylethylenediamine by dissolving 0.9344 gram (1 equivalent) of the base and 1.0656 grams (2 equivalents) of salicylic acid in 20 ml. of ethanol and filling up to the 200 ml. mark with distilled water. The molecular weight of the disalicylate salt is 518.68; 46.73% of which is the base.

A 1% solution of the beta-resorcylate of N-isopropyl,

N-n-octyl, N',N'-dimethylethylenediamine was prepared by dissolving 1.222 grams of (1 equivalent) of the base and 0.778 gram (1 equivalent) of beta-resorcylic acid in 200 ml. of ethanol and filling up to the 200 ml. mark with distilled water. The molecular weight of the beta-resorcylate salt is 396.558; 61.11% of which is the base.

A 1% solution of the p-aminobenzoate of N-isopropyl, N-n-octyl N',N'-dimethylethylenediamine was prepared by dissolving .277 grams (1 equivalent) of the base and 0.723 gram (1 equivalent) of p-amino benzoic acid in 10 ml. of ethanol and filling up to the 200 ml. mark with distilled water. The molecular weight of the p-aminobenzoate salt is 379.57; 63.86% of which is the base.

These solutions were diluted for bacteriological tests the usual way and the results obtained were the same as with the solutions prepared by dissolving the crystalline salts.

The p-aminobenzoate of N-isopropyl, N-n-octyl, N',N'-dimethylethylenediamine is of particular interest, as it shows increased activity in vitro against *tubercle bacilli*, both human and bovine type.

*Minimal bacteriostatic concentrations in mg./percent*

| Organism Tested | Base | p-amino-benzoic acid | Base p-amino-benzoate |
|---|---|---|---|
| St. aur | 16 | 40 | 4 |
| M. tub. hom | 4 | >64 | 4 |
| M. tub. bov | 8 | >64 | 2 |

EXAMPLE 9

A mixture of 2.7 grams of N-dodecyl-N-methyl-N',N'-dimethylethylene diamine and 1.67 grams of isocinchomeronic acid are ground together under pressure. Heat is evolved and the resulting solidified mixture is dissolved in hot methanol. On cooling the methanol solution, a white crystalline product precipitates out and, after being filtered off and washed with cold methanol and ether is dried under vacuum. The product, N-dodecyl-N-methyl-N',N' - dimethylethylenediamine di - isocinchomeronate, $C_{17}H_{38}N_2 \cdot 2C_7H_5O_4N$, melts at 181–184° C. A 1% aqueous solution has a pH of 3.5. In a nitrogen analysis (Micro-Dumas), there was found N=9.22%, theory 9.29%. A determination by neutralization equivalent indicates that the product contains 52.5% isocinchomeronic acid, the theoretical amount being 55.0% isocinchomeronic acid.

*Minimal bacteriostatic concentration in mg./percent*

| Organism Tested | Base of Example 9 | A | B |
|---|---|---|---|
| Vt. metch | 0.25 | 32 | 0.16 |

A = isocinchomeronic acid.
B = base di-isocinchomeronate.

EXAMPLE 10

2.7 grams of N-dodecyl-N-methyl-N',N'-dimethylethylenediamine are dissolved in 4 parts by weight of absolute ethanol and 3.4 grams of quinolinic acid are added. A clear solution is obtained on heating. The addition of a small amount of absolute ether causes a straw-colored hydroscopic oil to separate. The oily product, N - dodecyl - N methyl - N',N' - dimethylethylenediamine di - quinolinate, $C_{17}H_{38}N_2 \cdot 2C_7H_5O_4N$, does not solidify on standing.

A 1% solution of N-dodecyl-N,N',N'-trimethylethylenediamine di-quinolinate is obtained by adding 1.35 grams of the diamine and 1.67 grams of quinolinic acid to 10 ml. of water bringing the solution up to a volume of 30.2 ml. to form a 10% aqueous solution and further diluting the solution with sufficient water to form the 1% solution.

Bacteriological studies show that some of the above salts do exert a bacteriostatic action in very dilute solutions, therefore, they may be applied as general skin disinfectants. They may also be incorporated in ointments, particularly in hydrophilic ointment, U. S. P. and the like. 0.5–5% of the salt dissolved in the ointment gave quite satisfactory results.

This application is a continuation-in-part of co-pending application S. No. 243,370, filed August 23, 1951, now abandoned.

We have described our invention in detail and with respect to preferred forms, as many widely different embodiments of this invention may be made without departing from the spirit and scope therein. We do not intend to limit ourselves to the specific embodiments herein set forth, except as indicated in the claims.

What we claim is:

1. The water soluble salts of tetra-alkyl ethylenediamines of the general formula:

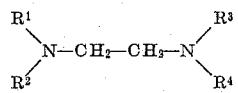

in which $R^1$ is an alkyl group containing 6 to 14 carbon atoms, and $R^2$, $R^3$, and $R^4$ are lower alkyl radicals containing 1 to 3 carbon atoms, with a member of the group consisting of homocyclic mononuclear aromatic carboxylic acids and heterocyclic mononuclear carboxylic acids.

2. The water soluble salts of tetra-alkylethylenediamines of the general formula:

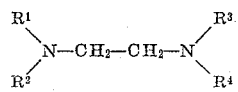

in which $R^1$ is an alkyl group containing 6 to 14 carbon atoms, and $R^2$, $R^3$, and $R^4$ are lower alkyl radicals containing 1 to 3 carbon atoms, and an aromatic acid of the formula: ACOOH, where A is a member of the group consisting of phenyl, hydroxy-substituted phenyl, amino-substituted phenyl, benzyl, hydroxy benzyl, beta-phenyl ethyl, gamma-phenyl propyl, styryl, beta-hydroxy beta-phenyl ethyl, pyridyl and carboxy-substituted pyridyl radicals.

3. The products according to claim 1, in which the base is N-(n-dodecyl)-N, N',N'-trimethylethylenediamine.

4. The products according to claim 1, in which the base is N - (n - hendecyl) - N,N',N' - trimethylethylene - diamine.

5. The products according to claim 1, in which the base is N-isopropyl-N-n-octyl-N',N'-dimethylethylenediamine.

6. The beta-resorcylate of the bases of the general formula:

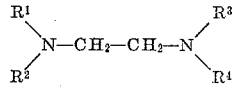

in which $R^1$ is an alkyl group containing 6 to 14 carbon atoms, and $R^2$, $R^3$ and $R^4$ are lower alkyl radicals containing 1 to 3 carbon atoms.

7. The dimandelate of the bases of the general formula:

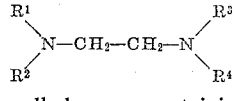

in which $R^1$ is an alkyl group containing 6 to 14 carbon atoms, and $R^2$, $R^3$ and $R^4$ are lower alkyl radicals containing 1 to 3 carbon atoms.

8. The disalicylate of the bases of the general formula:

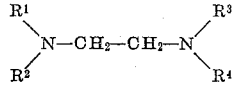

in which $R^1$ is an alkyl group containing 6 to 14 carbon atoms, and $R^2$, $R^3$ and $R^4$ are lower alkyl radicals containing 1 to 3 carbon atoms.

9. The di-isocinchomeronate of the bases of the general formula:

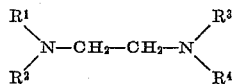

in which $R^1$ is an alkyl group containing 6 to 14 carbon atoms, and $R^2$, $R^3$ and $R^4$ are lower alkyl radicals containing 1 to 3 carbon atoms.

10. The di-quinolinate of the bases of the general formula:

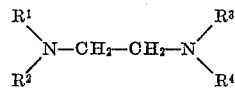

in which $R^1$ is an alkyl group containing 6 to 14 carbon atoms, and $R^2$, $R^3$ and $R^4$ are lower alkyl radicals containing 1 to 3 carbon atoms.

11. The beta-resorcylate of N-(n-dodecyl)-N,N',N'-trimethylethylenediamine of the formula $C_{24}H_{44}O_4N_2$.

12. The dimandelate of N-(n-dodecyl)-N,N',N'-trimethylethylenediamine of the formula $C_{33}H_{52}N_2O_6$.

13. The disalicylate of N-(n-dodecyl)-N,N',N'-trimethylethylenediamine of the formula $C_{31}H_{50}O_6N_2$.

14. The disalicylate of N-isopropyl,N-n-octyl-N',N'-dimethylethylenediamine of the formula $C_{29}H_{46}O_3N_2$.

15. The di-isocinchomeronate of N-(n-dodecyl)-N,N',N'-trimethylethylenediamine of the formula $$C_{31}H_{48}O_8N_4$$

16. The method of forming water soluble salts of tetraalkylethylenediamines of the general formula:

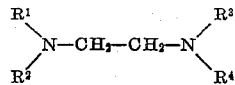

in which $R^1$ is an alkyl group containing 6 to 14 carbon atoms, and $R^2$, $R^3$ and $R^4$ are lower alkyl radicals containing 1 to 3 carbon atoms, which comprises reacting said bases with a homocyclic, mononuclear aromatic carboxylic acid.

17. The method of forming water soluble salts of tetraalkylethylenediamines of the general formula:

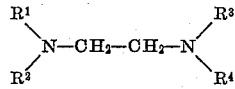

in which $R^1$ is an alkyl group containing 6 to 14 carbon atoms, and $R^2$, $R^3$ and $R^4$ are lower alkyl radicals containing 1 to 3 carbon atoms, which comprises reacting said bases with a heterocyclic, mononuclear carboxylic acid.

References Cited in the file of this patent

Frost et al.: J. Am. Chem. Soc. 71: 3842–3843 (1949).